United States Patent
Krass et al.

[15] 3,655,212
[45] Apr. 11, 1972

[54] SELF-SUPPORTING CART

[72] Inventors: Morton Krass, 808 Fitzhenry Court, Glenwood, Ill. 60425; Walter Nelson, 8008 South Chicago Avenue, Chicago, Ill. 60617

[73] Assignee: said Krass, by said Nelson

[22] Filed: Apr. 13, 1970

[21] Appl. No.: 27,885

[52] U.S. Cl. ..................280/36 R, 280/47.2, 280/47.28
[51] Int. Cl. ..........................................................B62b 1/04
[58] Field of Search ..............280/47.2, 47.21, 47.27, 47.28, 280/47.29, 36 R, 36 C, 41, 43.24; 211/178; 248/188.6

[56] References Cited

UNITED STATES PATENTS

| 366,554 | 7/1887 | Benedict | 280/47.28 |
|---|---|---|---|
| 627,284 | 6/1899 | Walker | 280/47.2 X |
| 1,913,295 | 6/1933 | Schreck | 280/47.2 UX |
| 2,598,168 | 5/1952 | Hooz et al. | 280/47.2 X |
| 2,605,117 | 7/1952 | Hooz et al. | 280/47.27 X |
| 2,612,386 | 9/1952 | Schutzer et al. | 280/41 X |
| 2,872,967 | 2/1959 | Kirkpatrick | 280/36 X |
| 2,715,533 | 8/1955 | Strausburg | 280/36 C |

FOREIGN PATENTS OR APPLICATIONS

| 692,700 | 6/1953 | Great Britain | 280/DIG. 6 |
|---|---|---|---|
| 531,830 | 8/1955 | Italy | 280/47.2 |

Primary Examiner—Leo Friaglia
Assistant Examiner—John A. Pekar
Attorney—Wallenstein, Spangenberg, Hattis & Strampel

[57] ABSTRACT

A self-supporting cart includes a base frame carrying a front pair of laterally spaced roller means and a rear pair of laterally spaced roller means, and a load-receiving frame pivoted to the front end portion of the base frame. The bottom ends of a pair of elongated bracing members are pivotably connected to the rear end of the base frame and the upper ends thereof are pivotably connected to a pair of slide members slidable along the load-receiving frame. A pair of retractable pins operated by a pair of squeeze handles selectively lock the slide members in any one of a number of different positions along the load-receiving frame. The base frame has a U-shaped configuration opening to the rear of the cart.

6 Claims, 11 Drawing Figures

Patented April 11, 1972 3,655,212
2 Sheets-Sheet 1
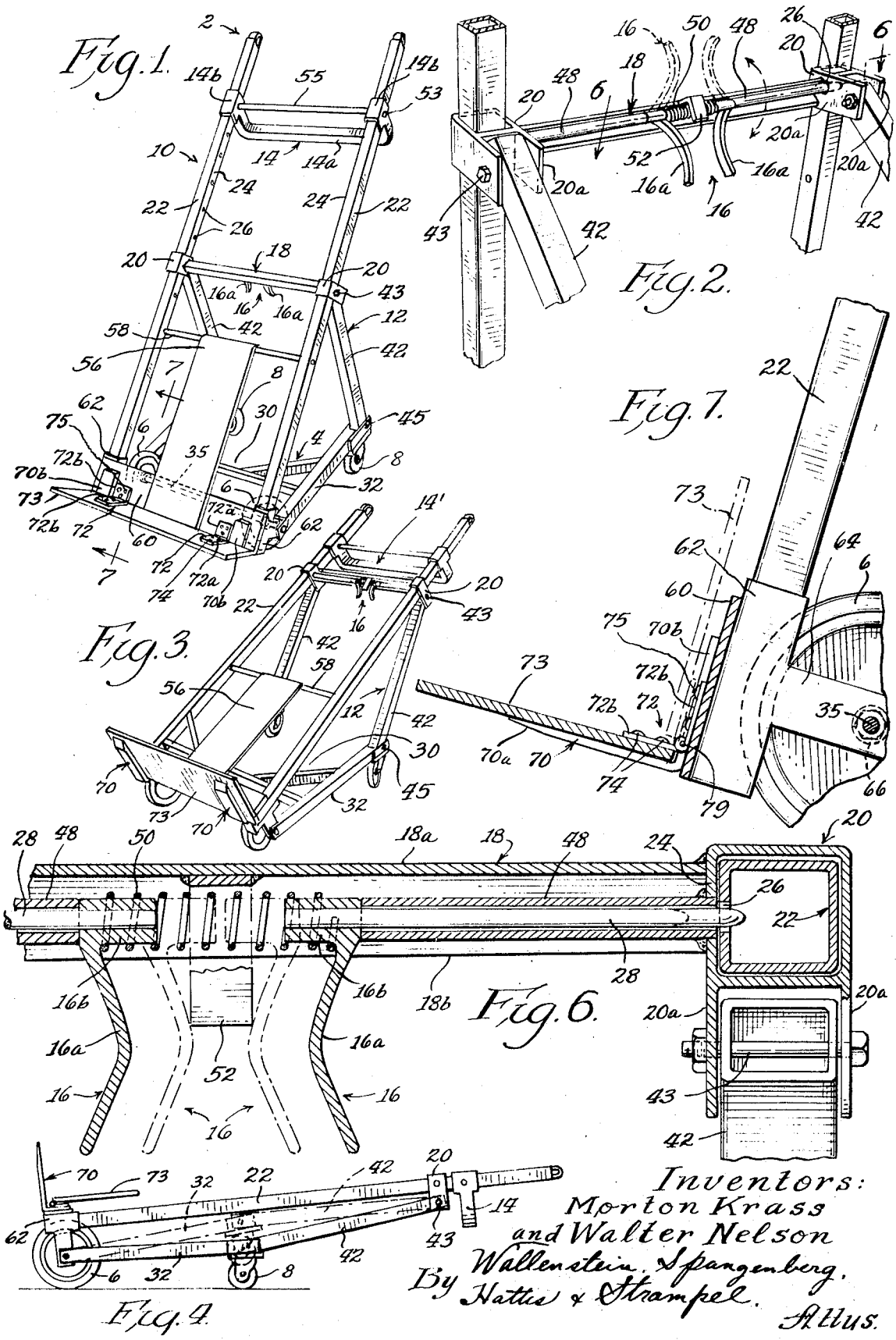
Inventors:
Morton Krass
and Walter Nelson
By Wallenstein, Spangenberg,
Hattis & Strampel
Attys.

Patented April 11, 1972
3,655,212
2 Sheets-Sheet 2
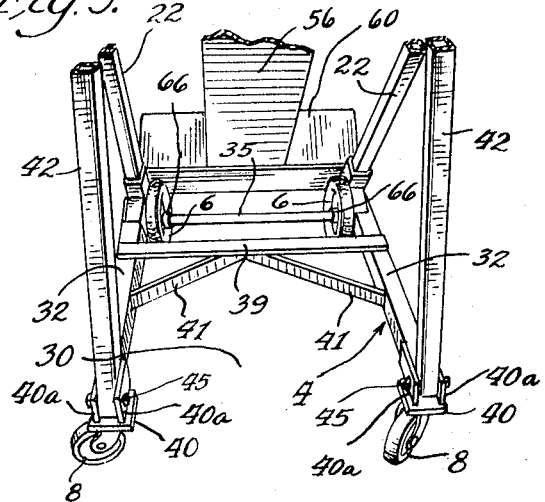
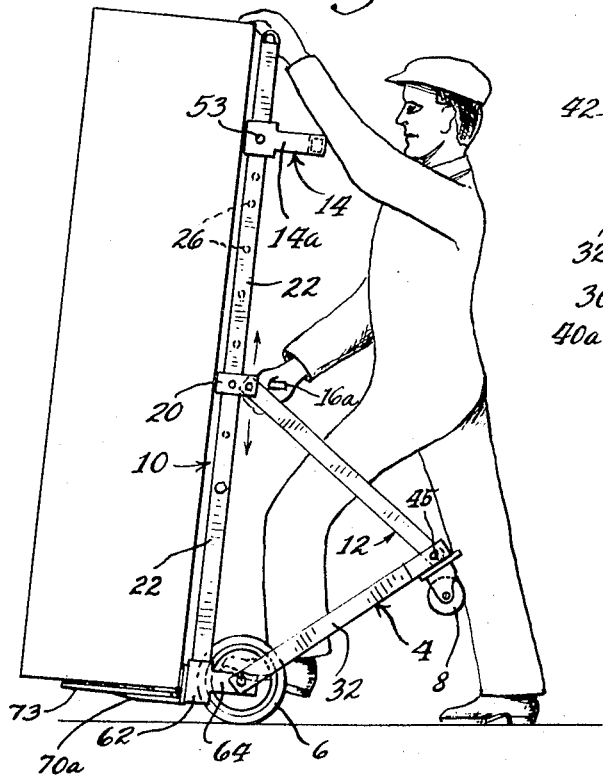
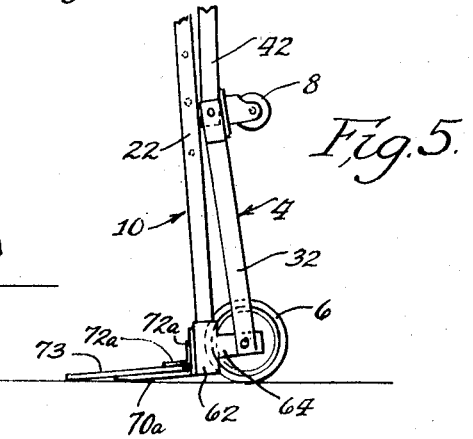
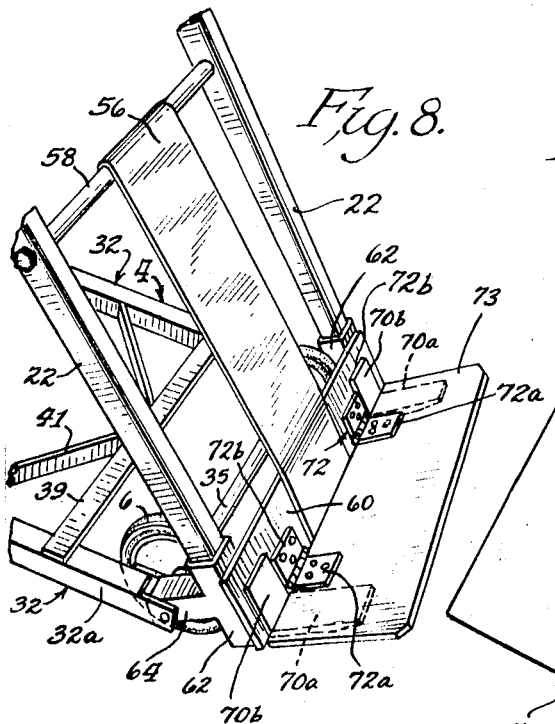
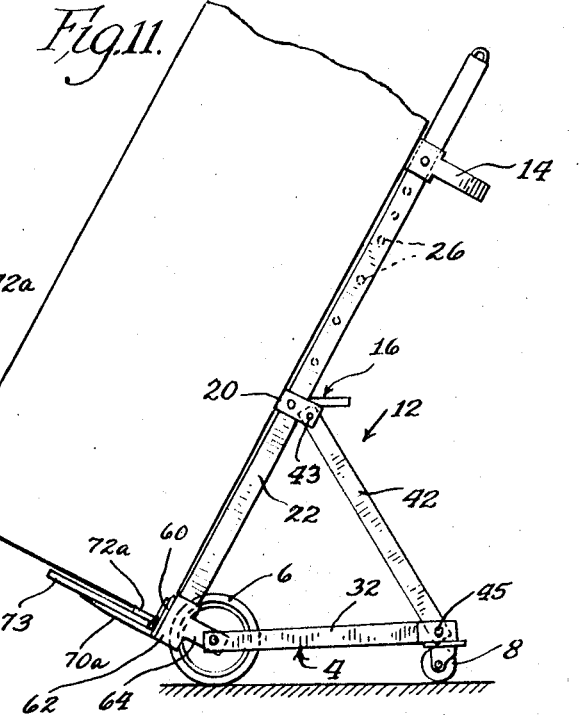

SELF-SUPPORTING CART

This invention relates to self-supporting carts which can be transported about by pushing or pulling the same along a floor surface, and wherein unloading or loading of the cart may be achieved by tilting the cart forwardly upon the front wheels thereof to bring the load-receiving frame portion thereof to a near vertical position.

In carts of this type, to enable the cart to be easily tilted forwardly for unloading or loading purposes and backwardly to its normal stable position, it is important that the center of gravity of loads of various weights and configurations be maintained at a point just behind the front wheels of the cart. To this end, the load-receiving frame thereof is generally made adjustable in angle. For relatively long heavy loads, such as mattresses, bed springs and the like, the load-receiving frame should be adjusted at a relatively large angle with respect to the horizontal, and for smaller loads it is generally more convenient to support the load-receiving frame at a much smaller angle to the horizontal.

The adjustable self-supporting, tiltable carts heretofore developed have left much to be desired from the standpoint of the manipulations and effort required by the user in adjusting the angle of the load-receiving frame and loading and unloading articles onto the cart, and in the stability and strength of the cart obtained for a given cost of manufacture. In the most advantageous form of the present invention, a very strong and stable cart is provided at a relatively modest cost and the cart is easily adjustable and is designed so the user can center himself closely behind the load-receiving frame when the frame is tilted forwardly, so the user may then readily manipulate loads onto and off of the cart. To this end, in accordance with one of the features of the invention, the angle of the load-receiving frame is adjustable by the squeezing or the like of a lock release handle means which unlocks the backing frame from a given angular position and permits the angle of the load-receiving frame to be adjusted by pushing or pulling the handle means while the same is continuously squeezed. The squeeze handle means is also most advantageously bodily rotatable along a horizontal laterally extending axis so the handle means may be grasped in the same comfortable position of the user's hand independently of the particular elevation or angular position of the means which supports the handle means.

In accordance with another aspect of the present invention, the handle means and locking means operated thereby are carried by one or more slide members slidable along the load-receiving frame of the cart. The one or more slide members are pivotally connected to the top of one or more elongated bracing members whose bottom ends are pivotally connected to the rear end portion of the base frame of the cart. In the case where the load-receiving frame comprises a pair of laterally spaced side rails, the slide members preferably envelope the side rails and are locked into any one of a number of selected positions along the side rails by spring urged pins entering apertures in the side rails. Each of the pins is most advantageously operated by a separate handle member so that the inadvertent striking of one of the handle members will not effect the other retractable pin to cause the undesired collapse of the load-receiving frame. The handles for operating the two retractable pins are preferably brought into confronting relation so that they can be grasped by a single hand and squeezed together to release both pins when it is desired to adjust the angle of the load-receiving frame.

In accordance with still another aspect of the invention, the base frame carries, in addition to a pair of front widely laterally spaced wheels or roller means, a pair of rear widely laterally spaced wheels or roller means attached to the rear end portion of the base frame, thereby providing four widely spaced points of support for the cart. This and other features of the invention enable the cart to stably carry very large loads like sofas and the like in addition to smaller and lighter articles.

In accordance with another aspect of the invention, the base frame is preferably of a U-shaped configuration opening onto the rear of the cart or otherwise constructed to provide an opening into which the user may position himself immediately behind the load-receiving frame when the cart is tilted forwardly where he can most conveniently manipulate heavy loads onto and off of the cart.

Other features of the invention permit the cart to be readily folded into a very flat compact shape and locked into this folded position.

The above and other advantages and features of the invention will become apparent upon making reference to the specification to follow, the claims and the drawings wherein:

FIG. 1 is a perspective view of the self-supporting cart constructed in accordance with the most preferred form of the invention where the load-receiving frame has a maximum angle to the floor;

FIG. 2 is a fragmentary enlarged perspective view of the portion of the cart of FIG. 1 which includes handle means for adjusting the angle of inclination of the load-receiving frame thereof;

FIG. 3 is a perspective view of the cart shown in FIG. 1 with the load-receiving frame at a less steep angle than that shown in FIG. 1;

FIG. 4 is a side elevational view of the cart in FIG. 1 with the load-receiving frame adjusted to its minimum angle to the floor;

FIG. 5 is a fragmentary side elevational view of the cart of FIG. 4 where a base frame and bracing frame thereof are folded inwardly to form a completely folded cart structure self-supporting in a vertical position;

FIG. 6 is a fragmentary sectional view of the portion of the cart shown in FIG. 2, taken along section line 6—6 thereof;

FIG. 7 is an enlarged fragmentary vertical sectional view of a portion of the cart shown in FIG. 1, taken along section line 7—7 thereof;

FIG. 8 is a fragmentary enlarged side elevational view of the other side of the cart as shown in FIG. 1;

FIG. 9 is a fragmentary view of the cart as shown in FIG. 1 as viewed from the rear of the cart;

FIG. 10 is a side elevational view of the cart tilted forwardly just prior to discharging a load or just after receiving a load; and FIG. 11 is a side elevational view of the cart as shown in FIG. 1 carrying a very large, heavy load.

Referring now to the drawings, the self-supporting cart 2 there shown includes a base frame 2 carrying a front pair of widely laterally spaced wheels 6—6 of relatively large diameter and a rear pair of widely laterally spaced swiveling wheels 8—8 of relatively small diameter. There is pivotally supported at the front end of the base frame 4 a load-receiving frame generally indicated by reference numeral 10. In a manner to be described, the load-receiving frame 10 is adapted to be supported at any one of a number of selected angles with respect to the floor or base frame 4, so that loads of various sizes and weights can be supported in a position where the center of gravity is positioned just behind the front pair of wheels 6—6 where it is easy to tilt the cart between a normal horizontal position and a forwardly tilted position. The load-receiving frame 10 is stably supported in various adjusted angular positions by a bracing frame generally indicated by reference numeral 12. A handle-forming bar 14 extends between the upper extremity of the load-receiving frame 10, the bar forming a convenient handle for pushing or pulling the cart along a floor surface.

The angle between the load-receiving frame 10 and the base frame 4 is adjustable by means of squeeze handle means 16 located between the upper and lower extremities of the load-receiving frame 10. The illustrated squeeze handle means 16 is supported on a cross-bar 18 connected to a pair of slide members 20—20 enveloping a pair of side rails 22—22 forming part of a backing portion of the load-receiving frame 10. The side rails 22—22 are of hollow rectangular cross-section and the innermost vertical walls 24—24 thereof are provided with corresponding longitudinally spaced apertures 26 into which are urged locking pins 28—28 mounted within the cross-bar 18 in a manner to be described. The squeezing of the handle means 16 withdraws the locking pins 28—28 from a pair of apertures 26 in the side rails 22—22 so that the user can push or pull on the handle means 16 to slide the cross-bar 18 and the associated slide members 20—20 to a selected position along the side rails 22—22 which varies the angle of the side rails. With release of the squeeze handle means 16, the locking pins 28—28 can enter another pair of side rail apertures 26—26 to lock the rails into a new selected angular position. Also, in a manner to be described, the squeeze handle means 16 are rotatable about a lateral horizontal axis as illustrated in FIG. 2, so that the operator can comfortably grip the squeeze handle means 16 for all positions of the cross-bar 18.

An important feature of the present invention relates to the design of the base frame 4 so that a large opening 30 is provided therein formed most advantageously between laterally spaced side members 32—32 at the front and rear ends of which are respectively supported the wheels 6—6 and 8—8. The side members 32—32 are desirably unconnected at the rear ends thereof so to present an unobstructed entryway into the opening 30 of the the base frame. Thus, an operator can easily walk into the opening 30 when the cart is tilted forwardly where he can center himself immediately behind the load-receiving frame 10 where he can more easily manipulate large and heavy loads onto and off of the cart. Also, in the process of lowering or raising the rear end of the cart, he can easily steady the cart by placing his foot on a front axle 35 and he can readily grip the handle means 16 in one hand and pull or push the upper end of the cart as desired with his other hand.

Now that some of the basic features of the invention have been described, the details of construction of the preferred illustrated embodiment thereof will now be described. Thus, the base frame 4, in addition to the laterally spaced side members 32—32 which are preferably rectangular tubular members, also include a cross-bar 39 welded to the side members 32—32, and bars 41—41 extending between the cross-bar 39 and the side members 32—32. At last shown in FIG. 9, the rear wheels 8—8 are swivel mounted in brackets 40—40 in turn secured to the rear ends of the base frame side members 32—32.

The bracing frame 12, as illustrated, comprises a pair of elongated bracing members 42—42 which are preferably rectangular tubular members. The upper end of each of the bracing members extends between and is pivotally connected to a pair of legs 20a—20a depending from the associated slide member 20 by a pivot bolt 43 (FIG. 6). The bottom end of each of the bracing members extends between and is pivoted to a pair of upwardly extending legs 40a—40a of the associated roller carrying bracket 40 by a bolt 45.

The cross-member 18 extending between the slide members 20—20 may comprise an angle member including a front wall 18a (FIG. 6) and a bottom wall 18b. The cross-member 18 is confronted by a pair of aligned open-ended sleeves 48—48 respectively welded to the adjacent slide members 20—20 to form guides for the sliding movement of the locking pins 28—28. The locking pins 28—28 are secured by welding or otherwise within the hollow hubs 16b—16b of individual handle members 16a—16a constituting the aforesaid handle means 16. The hubs of the handle members are urged outwardly by a coil spring 50 whose ends bear against the base portions of the handle members 16a—16a to separate the inner ends of the hollow hub 16b—16b. The handle members 16a—16a are spaced relatively closely together so that they can be readily grasped within a user's hand to be bodily rotated about the axes of the sleeves 48—48 (FIG. 2) and/or to be squeezed to bring the handle members against a stop member 52 welded to the front wall 18a of the cross-member 18. When the members engage the stop member 52, the locking pins 28—28 are completely withdrawn from the side rail apertures 26—26 of the load-receiving frame 10. The coil spring 50 normally urges the outer faces of the hollow hubs 16b—16b of the handle members against the inner edges of the guide sleeves 48—48. The friction between the contacting surfaces of the hollow hubs 16b—16b and the sleeves 48—48 is such that the handle members 16a—16a will remain in any of their various adjusted positions of rotation extending between an upper extreme position where the handle members contact the top of the front wall 18a of the cross-member 18 and a bottom extreme position where it contacts the rear of the bottom wall 18b of the cross-member.

As illustrated, the handle-forming bar 14 is a U-shaped member 14a which extends down below the bottom of the side rails 22—22 at a point adjacent to but spaced from the upper ends of the side rails. The ends of the U-shaped member 14a terminate in rectangular socket-forming portions 14b—14b which receive the rectangular tubular side rails 22—22 and are anchored thereto as by bolts 53 or the like. A bracing rod 55 extends between the inner faces of the socket-forming portions 14b—14b.

In addition to the side rails 22—22, the load-receiving frame 10 includes a vertically elongated backing plate 56 extending between and generally parallel to the side rails 22—22, the upper end of the backing plate 56 being secured to a cross-rod 58 connected between the side rails 22—22 and the bottom end thereof being secured to a cross-plate 60 welded to a pair of socket-forming members 62—62 which extend around the side rails 22—22 and are anchored thereto in any suitable way. Each of the socket-forming members 62 has a rearwardly and downwardly extending leg 64. As shown in FIG. 8, the legs 64—64 of the socket-forming members 62—62 fit between spaced side walls 32a—32a of the base frame side members 32—32. The axle 35 extends outwardly through openings in the legs 64—64 of the socket-forming members 62—62, and the side walls 32a—32a of the base frame side members 32—32 and pivotally support the entire load-receiving frame 10. The axle 35 is provided with thrust bearing projections 66—66 (FIG. 9) against which the inner ends of the hubs of the wheels 6—6 abut. The wheels are held in spaced relation to the adjacent base frame side members 32—32 by washers 66—66 (FIG. 7) or the like applied around the axle 35.

A pair of fork members 70—70 are anchored to the sides of the cross-plate 60. The fork members 70—70 have forwardly extending pointed legs 70a—70a and upwardly extending mounting lets 70b—70b, the latter legs being welded or otherwise secured to the cross-plate 60. The forwardly extending legs 70a—70a of the fork members 70—70 extend at right angles to the cross-plate 60 to form a convenient support extendable into small spaces beneath articles to be lifted onto the cart. For articles packed in cardboard cartons and the like, it is generally desirable to have a more extensive support surface engaging the bottom of the carton involved. To this end, a pivotally mounted rectangular support plate 73 is provided which in one position thereof rests upon the upper edges of the forwardly extending pointed legs 70a—70a of the fork members 70—70 and in another position extends upwardly where it rests against the backing plate 56 and exposes the pointed legs of the fork members. To this end, the illustrated support plate 73 is secured by screws 74 to the bottom of a pair of hinge plates 72a—72a of hinge assemblies 72—72. The hinge assemblies 72—72 have hinge plates 72a—72a which are pivotally interconnected to the hinge plates 72a—72a by hinge pins 79—79 and are secured by screws 75 to the front face of the cross-plate 60. (The support plate 73 or the pointed legs 70a—70a when used as a direct support for the bottom end of a load form what is referred to in the claims as a foot portion of the load-receiving frame 10.) The backing plate 56 and side rails 22—22 are referred to in the claims as the backing portion of the load-receiving frame 10.

The two extreme angular positions of the load-receiving frame 10 are best shown respectively in FIG. 1 and 4, FIG. 4 showing the load-receiving frame when the slide member 20—20 are in their lowermost locked positions and FIG. 1 showing the load-receiving frame when the slide members are in their uppermost locked positions. In the former case, the cart is in what may be referred to as a folded condition. When the slide members 20—20 are first moved into their outermost locked positions, the side members 32—32 of the base frame 4 and the bracing members 42—42 of the bracing frame 12 make a very large angle somewhat less than 180° where the crotch of the angle faces the side rails 22—22. In this condition of the cart, the base frame side members 32—32 and the bracing members 42—42 form a toggle joint where a relatively small amount of pressure applied at the apex of the angle between these members causes the same to snap into an inverted position shown in dashed lines in FIG. 4 and in solid lines in FIG. 5 where the crotch of the angle between these members faces away from the side rails 22—22. This is the most compact folded condition of the cart where the same can be conveniently stored and supported in a vertical position as shown in FIG. 5, since the center of gravity thereof is located forwardly of the front wheels 6—6 and directly above the support plate 73 and fork members 70—70.

When the cart is to be loaded, the user tilts the cart forwardly on the front wheels 6—6 until the fork members 70—70 or the support plate 73 rests upon the floor. The load can then be readily manipulated onto or off of the cart with the user positioned immediately behind the load-receiving frame 10 thereof. When loading the cart, the convenient location of the squeeze handles 16 enables the user readily to manipulate the angle of the load-receiving frame 10 to determine the angle thereof which placed the center of gravity a short distance behind the front wheels 6—6 where the effort required to tilt the cart is minimized.

The present invention thus provides an exceedingly stable, reliable, easy to adjust and to store, self-supporting, tiltable cart. Moreover, the cart is designed so that the user may very easily manipulate loads onto and off of the cart since he is able to get immediately behind the load-receiving frame when the cart is tilted into its forward position.

It should be understood that numerous modifications may be made in the most preferred form of the invention described above without deviating from the broader aspects of the invention.

We claim:

1. A self-supporting cart for handling cartons and the like, said cart comprising: base frame means carrying a pair of widely laterally spaced front roller means at the front end portion of said base frame means permitting the cart to be tilted forwardly during loading and unloading thereof and at least one rear roller means at the rear end portion of said base frame means where at least three points of rolling support are provided for the cart, load-receiving frame means pivotally mounted at the front end portion of said base frame means for fore and aft movement so the angle of inclination thereof is adjustable, said load-receiving frame means including a forwardly extending foot portion for engaging the initially bottom end of a load to be carried and an upwardly and rearwardly inclining backing portion forming a backing support for the load, bracing frame means pivotally connected to the rear end portion of said base frame means and said backing portion of said load-receiving frame means, slide connection means to which one of the ends of said bracing means are connected, said slide connection means being slidable forwardly and rearwardly along said backing portion so the connection between said backing portion and said bracing frame means can be maintained with the variation in the angle of said backing portion of the load-receiving frame means, and manually releasable locking means for selectively locking the bracing frame means and backing portions of said load-receiving frame means in any of a number of relative angular positions thereof, said manually releasable locking means being mounted for bodily movement with said slide connection means and including a pair of handles spaced so close so as to be grasped by a single hand of the user and each independently controlling a separate locking element urged into a locking position within said backing portion so both handles must be operated to release both locking elements to enable the angle of said backing portion and bracing frame means to vary by pulling or pushing on said handle means, said various frame means being of a size and construction to permit the user to be centered behind the frame to said backing portion of the load-receiving frame means and to grasp the handles as he tilts the cart forwardly on said pair of front roller means to raise the rear end of the cart during loading and unloading of the cart and as the tilted cart is lowered from a tilted position.

2. A self-supporting cart for handling cartons and the like, said cart comprising: base frame means carrying a pair of widely laterally spaced front roller means at the front end portion of said base frame means permitting the cart to be tilted forwardly during loading and unloading thereof and at least one rear roller means at the rear end portion of said base frame means where at least three points of rolling support are provided for the cart, load-receiving frame means pivotally mounted at the front end portion of said base frame means for fore and aft movement so the angle of inclination thereof is adjustable, said load-receiving frame means including a forwardly extending foot portion for engaging the initially bottom end of a load to be carried and an upwardly and rearwardly inclining backing portion forming a backing support for the load, bracing frame means connected between the rear end portion of said base frame means and said backing portion of said load-receiving frame means, said bracing frame means being pivotally supported at the opposite ends thereof so the angle thereof is variable relative to both said base frame means and said backing portion of said load-receiving frame means and being adjustable so the connection between said backing portion and said bracing frame means can be maintained with the variation in the angle of said backing portion of the load-receiving frame means, and manually releasable locking means for selectively locking the bracing frame means and backing portion of said load-receiving frame means in any of a number of relative angular positions thereof, said manually releasable locking means including handle-forming means for releasing the locking means where operated, said handle-forming means being carried by one of said backing portion of said load-receiving frame and bracing frame means and being bodily rotatable about a horizontal axis extending transversely with respect to the same so they can be grasped and operated with the hand being in about the same angular position for the varying angular positions of the portion of the cart carrying the same.

3. The self-supporting cart of claim 2 wherein said handle-forming means are a pair of spaced handles to be grasped and squeezed by one hand of the user to release said locking means.

4. A self-supporting cart for handling cartons and the like, said cart comprising: base frame means carrying a pair of widely laterally spaced front roller means at the front end portion of said base frame means permitting the cart to be tilted forwardly during loading and unloading thereof and at least one rear roller means at the rear end portion of said base frame means where at least three points of rolling support are provided for the cart, load-receiving frame means pivotally mounted at the front end portion of said base frame means for fore and aft movement so the angle of inclination thereof is adjustable, said load-receiving frame means including a forwardly extending foot portion for engaging the initially bottom end of a load to be carried and an upwardly and rearwardly inclining backing portion forming a backing portion forming a backing support for the load, said backing portion of said load-receiving frame means including a pair of widely laterally spaced side rails, a pair of laterally spaced bars respectively pivotally connected at the bottom ends thereof to the rear end portion of said base frame means for fore and aft pivotal movement thereon and pivotally connected to a pair of slide members at the upper ends thereof, said slide members being mounted for fore and aft sliding movement on said side rails so the elongated bracing bars maintain connection with said side rails through said slide members for the various angles of extent thereof, manually releasable locking means for locking said slide means to said backing portion in any one of a number of selected positions thereof where said backing portion has a desired selection of anguiar positions relative to said base frame means, said locking means including retractable pins carried by said slide members and longitudinally spaced laterally inwardly opening apertures in said side rails, said locking pins being spring urged into a selected corresponding pair of apertures in said side rails, and said manually releasable locking means including a pair of laterally spaced squeezable handles each of which controls independently the withdrawing of one of said locking pins from an aperture in one of said side rails.

5. A self-supporting cart for handling cartons and the like, said cart comprising: base frame means carrying a pair of widely laterally spaced front roller means at the front end portion of said base frame means permitting the cart to be tilted forwardly during loading and unloading thereof and at least one rear end portion of said base frame means where at least three points of rolling support are provided for the cart, load-receiving frame means pivotally mounted at the front end portion of said base frame means for fore and aft movement so the angle of inclination thereof is adjustable, said load-receiving frame means including a forwardly extending foot portion for engaging the initially bottom end of a load to be carried and an upwardly and rearwardly inclining backing portion forming a backing support for the load, elongated bracing frame means pivotally connected at the bottom ends thereof to the rear end portion of said base frame means for fore and aft pivotal movement thereon and pivotally connected to slide means at the upper ends thereof, said slide means being mounted for fore and aft sliding movement on said backing portion of said load-receiving frame means so the elongated bracing means maintains connection with said backing portion for the various angles of extent thereof, said backing portion of said load-receiving frame means in one of said angular positions being contiguous and almost parallel to said base frame means and said elongated bracing means, wherein the cart is effectively in a compact folded condition for storage, and said base frame means and bracing means being opposite and spaced from said backing portion when the cart is in said compact folded condition, said bracing means and base frame means then forming a snap-action toggle lever system where they initially make an angle of near 180° facing said backing portion and with a modest force applied to the point where they are pivotally connected will snap into an angle facing away from said backing portion and manually releasable locking means for locking said slide means to said backing portion in any one of a number of selected positions thereof where said backing portion has a desired selection of angular positions relative to said base frame means and handle means at the rear of the cart which handle means can be grasped by the operator for pushing or pulling the cart.

6. A self-supporting cart for handling cartons and the like, said cart comprising: base frame means carrying a pair of widely laterally spaced front roller means at the front end portion of said base frame means permitting the cart to be tilted forwardly during loading and unloading thereof and at least one rear roller means at the rear end portion of said base frame means where at least three points of rolling support are provided for the cart, load-receiving frame means pivotally mounted at the front end portion of said base frame means for fore and aft movement so the angle of inclination thereof is adjustable, said load-receiving frame means including a forwardly extending foot portion for engaging the initially bottom end of a load to be carried and an upwardly and rearwardly inclining backing portion forming a backing support for the load, elongated bracing frame means pivotally connected at the bottom ends thereof to the rear end portion of said base frame means for fore and aft pivotal movement thereon and pivotally connected to slide means at the upper ends thereof, said slide means being mounted for fore and aft sliding movement on said backing portion of said load-receiving frame means so the elongated bracing means maintains connection with said backing portion for the various angles of extend thereof, manually releasable locking means for locking said slide means to said backing portion in any one of a number of selected positions thereof where said backing portion has a desired selection of angular positions relative to said base frame means, said manually releasable locking means being mounted for bodily movement with said slide means and including a pair of spaced handles at the rear of said backing portion of said load-receiving frame means and arranged to be grasped and squeezed by one hand of the user to release the locking means to permit said slide means to move along said backing portion to permit the user to be centered behind the frame close to said backing portion of the load-receiving frame means and to grasp the handles as he tilts the cart forwardly on said pair of front roller means to raise the rear end of the cart during loading and unloading of the cart and as the tilted cart is lowered from a tilted position and while doing so to push or pull said handles while said locking means is released to vary the angle of said backing portion of said load-receiving frame.

* * * * *